(12) United States Patent
Zhang et al.

(10) Patent No.: US 11,314,751 B2
(45) Date of Patent: Apr. 26, 2022

(54) METHOD AND APPARATUS FOR ACQUIRING INFORMATION

(71) Applicant: Baidu Online Network Technology (Beijing) Co., Ltd., Beijing (CN)

(72) Inventors: Xiaodi Zhang, Beijing (CN); Chengze Chen, Beijing (CN); Yunfeng Xu, Beijing (CN); Weiyu Chen, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 428 days.

(21) Appl. No.: 16/267,742

(22) Filed: Feb. 5, 2019

(65) Prior Publication Data

US 2019/0243830 A1   Aug. 8, 2019

(30) Foreign Application Priority Data

Feb. 5, 2018  (CN) .......................... 201810113709.0

(51) Int. Cl.
   *G06F 16/2458* (2019.01)
   *H04W 4/029* (2018.01)
   *H04W 84/12* (2009.01)

(52) U.S. Cl.
   CPC ........ *G06F 16/2465* (2019.01); *H04W 4/029* (2018.02); *H04W 84/12* (2013.01)

(58) Field of Classification Search
   CPC ..... H04W 52/40; H04W 36/08; H04W 76/27; H04W 52/325; H04W 84/12; H04L 63/0245; H04L 63/1425; H04L 67/10; H04B 10/116; G06F 16/2465
   See application file for complete search history.

(56) References Cited

U.S. PATENT DOCUMENTS

| | | | |
|---|---|---|---|
| 9,734,402 B2* | 8/2017 | Jang ...................... | G06T 19/006 |
| 2018/0372836 A1* | 12/2018 | Lu ......................... | H04B 17/318 |
| 2019/0066403 A1* | 2/2019 | Nagura ................ | G08G 1/0112 |

* cited by examiner

*Primary Examiner* — Iqbal Zaidi
(74) *Attorney, Agent, or Firm* — Nixon Peabody LLP

(57) ABSTRACT

Embodiments of the present disclosure disclose a method and apparatus for acquiring information. A specific implementation of the method includes: acquiring a plurality of pieces of positioning data in a preset time period and a plurality of pieces of captured data captured by a WLAN probe device of a target point of interest in the preset time period; and finding, from the plurality of pieces of positioning data, a plurality of pieces of positioning data meeting a preset condition, and generating, based on the plurality of pieces of positioning data meeting the preset condition, indication information indicating whether the WLAN probe device being abnormal. The method realizes the evaluation of whether the WLAN probe device is abnormal, whether the deployment location of the WLAN probe device is reasonable, and whether it is necessary to add WLAN probe devices.

11 Claims, 4 Drawing Sheets

METHOD AND APPARATUS FOR ACQUIRING INFORMATION

CROSS-REFERENCE TO RELATED APPLICATIONS

This application is related to and claims priority from Chinese Application No. 201810113709.0, filed on Feb. 5, 2018 and entitled "Method and Apparatus for Acquiring Information," the entire disclosure of which is hereby incorporated by reference.

TECHNICAL FIELD

The present disclosure relates to the field of computer, specifically to the field of data mining, and more specifically to a method and apparatus for acquiring information.

BACKGROUND

Wireless Local Area Network (WLAN) probe devices can capture data associated with wireless access points in points of interest bound to the WLAN probe devices for data mining of the points of interest. In data mining of a point of interest, a commonly used method is to directly perform data mining on the point of interest using captured data captured by a third-party WLAN probe device.

SUMMARY

Embodiments of the present disclosure disclose a method and apparatus for acquiring information.

In a first aspect, the present disclosure provides a method for acquiring information. The method includes: acquiring a plurality of pieces of positioning data in a preset time period and a plurality of pieces of captured data captured by a WLAN probe device of a target point of interest in the preset time period, the captured data including: a terminal identifier, capture time, and an identifier of a wireless access point, and the positioning data including: a terminal identifier, positioning time, and a location; and finding, from the plurality of pieces of positioning data, a plurality of pieces of positioning data meeting a preset condition, and generating, based on the plurality of pieces of positioning data meeting the preset condition, indication information indicating whether the WLAN probe device being abnormal, the preset condition including: an included location being within a preset area associated with the target point of interest, an included terminal identifier matching a terminal identifier in one of the plurality of pieces of captured data, and included positioning time matching the capture time in the captured data.

In a second aspect, the present disclosure provides an apparatus for acquiring information. The apparatus includes: an acquisition unit, configured to acquire a plurality of pieces of positioning data in a preset time period and a plurality of pieces of captured data captured by a WLAN probe device of a target point of interest in the preset time period, the captured data including: a terminal identifier, capture time, and an identifier of a wireless access point, and the positioning data including: a terminal identifier, positioning time, and a location; and a state evaluation unit, configured to find, from the plurality of pieces of positioning data, a plurality of pieces of positioning data meeting a preset condition, and generate, based on the plurality of pieces of positioning data meeting the preset condition, indication information indicating whether the WLAN probe device being abnormal, the preset condition including: an included location being within a preset area associated with the target point of interest, an included terminal identifier matching a terminal identifier in one of the plurality of pieces of captured data, and included positioning time matching the capture time in the captured data.

The method and apparatus for acquiring information provided by the embodiments of the present disclosure acquire a plurality of pieces of positioning data in a preset time period and a plurality of pieces of captured data captured by a WLAN probe device of a target point of interest in the preset time period, the captured data including: a terminal identifier, capture time, and an identifier of a wireless access point, and the positioning data including: a terminal identifier, positioning time, and a location; and find, from the plurality of pieces of positioning data, a plurality of pieces of positioning data meeting a preset condition, and generate, based on the plurality of pieces of positioning data meeting the preset condition, indication information indicating whether the WLAN probe device being abnormal, the preset condition including: an included location being within a preset area associated with the target point of interest, an included terminal identifier matching a terminal identifier in one of the plurality of pieces of captured data, and included positioning time matching the capture time in the captured data. The method and apparatus realize the evaluation of whether the WLAN probe device is abnormal, and may further evaluate whether the deployment location of the WLAN probe device is reasonable, and whether it is necessary to add WLAN probe devices, which may acquire more comprehensive and accurate captured data for data mining after adjusting correspondingly based on the evaluation results.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
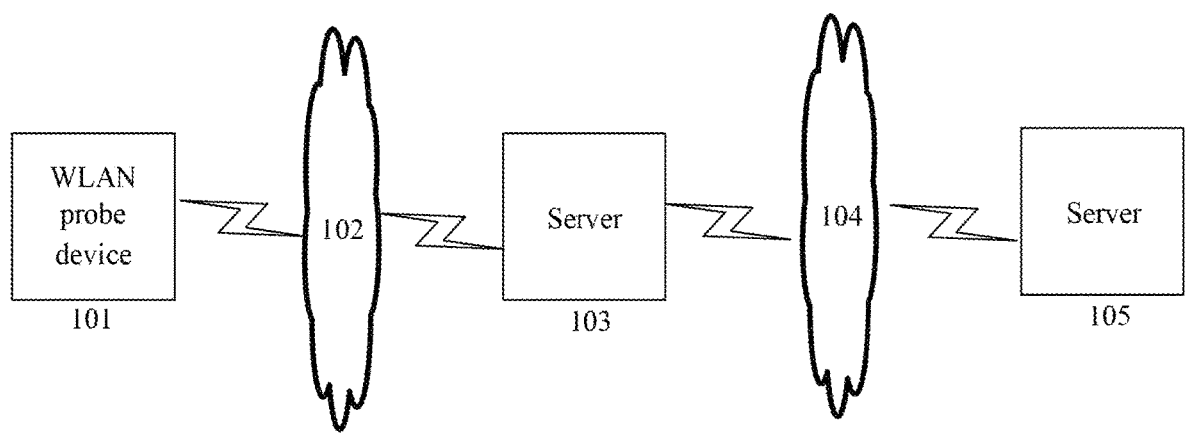
FIG. 1 illustrates an exemplary system architecture in which embodiments of a method or apparatus for acquiring information of the present disclosure may be implemented.

FIG. 1 illustrates an exemplary system architecture in which embodiments of a method or apparatus for acquiring information of the present disclosure may be implemented.

As shown in FIG. 1, the system architecture includes a WLAN probe device 101, a network 102, a server 103, a network 104, and a server 105. The network 102 may be a wired communication network or a wireless communication network. The network 104 is a wired communication network.

The WLAN probe device 101 may be deployed near a target point of interest, such as a store. When the type of the WLAN is WIFI, the WLAN probe device 101 is a WIFI WLAN probe device.

The WLAN probe device 101 may capture data transmitted between a terminal and a wireless access point within the capture range of the WLAN probe device 101. A frame of data transmitted between the terminal and the wireless access point may be used as a piece of captured data.

The WLAN probe device 101 may transmit the captured data captured latest to the server 103 at intervals of a preset duration or when the captured data reaches an amount threshold.

The server 105 may be a server that provides a Location Based Service (LBS) service, and the server 105 stores positioning data of a large number of users. The server 103 may acquire positioning data in a preset time period from the server 105.

A piece of positioning data includes: the terminal identifier of the terminal of a located user, positioning time, and the location of the located user.

The piece of positioning data may further include: an identifier of the wireless access point scanned by or an identifier of the wireless access point connected to the terminal corresponding to the terminal identifier in the positioning data, that is, the terminal of a located user, within the time period associated with the positioning time.

For example, a program associated with the location-based service running on the terminal reads location and positioning time through the GPS interface. When the terminal scans a plurality of wireless access points or connects at least one wireless access point after scanning the plurality of wireless access points in a time period associated with the positioning time, for example, in a time period starting from the positioning time and lasting for five minutes, the identifiers of the scanned plurality of wireless access points or the identifier of the connected wireless access point may constitute an identifier list, and the program associated with the location-based service may send the identifier of the terminal, the positioning time, the location, and the identifier list as a piece of positioning data to a server providing the location-based service. Therefore, the positioning data stored by the server providing the location-based service further includes the identifier list, that is, the identifiers of the scanned wireless access points or the identifier of the connected wireless access point.

Figure 2:
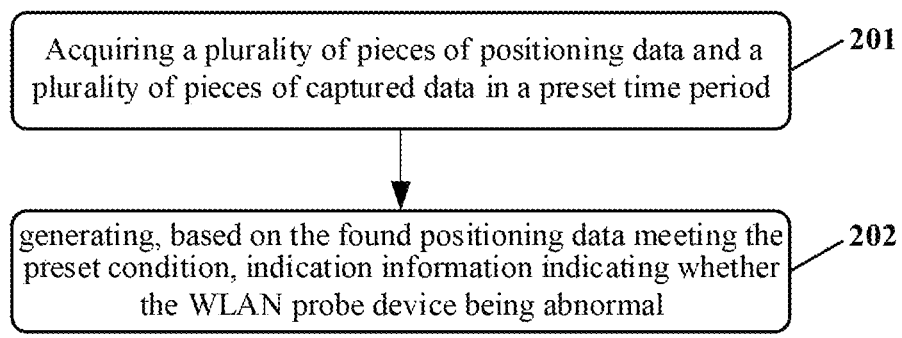
FIG. 2 illustrates a flowchart of an embodiment of the method for acquiring information according to the present disclosure.

With reference to FIG. 2, a flow of an embodiment of the method for acquiring information according to the present disclosure is illustrated. The method for acquiring information provided by the embodiments of the present disclosure may be performed by a server (for example, the server 103 in FIG. 1). The method includes the following steps.

Step 201, acquiring a plurality of pieces of positioning data and a plurality of pieces of captured data in a preset time period.

In the present embodiment, a WLAN probe device of a target point of interest may be deployed in or near the target point of interest. The captured data associated with the target point of interest captured by the WLAN probe device of the target point of interest may be used for data mining of the target point of interest.

A piece of positioning data includes: a terminal identifier, i.e., the identifier of the terminal of a located user, positioning time, and a location, i.e., the position of the user of the located user. In all the acquired positioning data, the number of positioning data including the same terminal identifier may be plural. The terminal identifier in the positioning data may be the Medium Access Control (MAC) address of the terminal. When the positioning time in one piece of positioning data is in a preset time period, the positioning data is in the preset time period.

A frame of data transmitted between the terminal and the wireless access point and captured by the WLAN probe device of the target point of interest may be used as a piece of captured data. The captured data captured by the WLAN probe device of the target point of interest includes: a terminal identifier, that is, an identifier of the terminal connected to the wireless access point (AP) or an identifier of the terminal scanning the wireless access point, the capture time, and an identifier of a connected or scanned wireless access point. The terminal identifier in the captured data may be the MAC address of the terminal, and the identifier of the wireless access point may be the name of the wireless access point. When the capture time in one piece of captured data is in a preset time period, the captured data is in the preset time period.

In the present embodiment, the plurality of pieces of captured data and the plurality of pieces of positioning data captured by the WLAN probe device in the preset time period may be acquired by the server.

For example, the target point of interest is a store in a shopping mall, and the preset time period is the business hours of the shopping mall in the day. The server may acquire a plurality of pieces of captured data captured by the WLAN probe device of the store during the business hours of the day and a plurality of pieces of positioning data during the business hours of the day.

Step 202, generating, based on the found positioning data meeting a preset condition, indication information indicating whether the WLAN probe device being abnormal.

In the present embodiment, a plurality of pieces of positioning data meeting a preset condition may be obtained from the acquired plurality of pieces of positioning data in the preset time period, that is, all the acquired positioning data in the preset time period, to generate indication information indicating whether the WLAN probe device being abnormal.

In the present embodiment, the preset condition includes: a position in the positioning data is within a preset area associated with the target point of interest, a terminal identifier in the positioning data matches a terminal identifier in one of the plurality of pieces of captured data and the positioning time in the positioning data matches the capture time in the captured data. When the time difference between capture time and positioning time is less than a threshold, for example, five minutes, the capture time matches the positioning time.

For example, the target point of interest is a store in a shopping mall, and the preset time period is the business hours of the shopping mall in the day. The acquired plurality of pieces of captured data are all the captured data captured by the WLAN probe device of the store during the business hours of the day, and the acquired plurality of pieces of positioning data are all the positioning data during the business hours of the day. The preset area associated with the store is a circular area having a radius of 500 meters with the position of the center point of the store as the center of the circular area. When one piece of all the positioning data during the business hours of the day includes a location in the preset area associated with the store, a terminal identifier included in the positioning data is identical to a terminal identifier in a piece of captured data captured by the WLAN probe device of the store, and the time difference between the positioning time included in the positioning data and the capture time in the captured data that contains the terminal identifier identical to that of the positioning data is less than the threshold, for example, five minutes, then the positioning data meets the preset condition.

In the present embodiment, when the positioning data meeting the preset condition is found, it may be determined that a user appears in or near the target point of interest and uses the terminal corresponding to the terminal identifier in the positioning data meeting the preset condition to connect to the wireless access point or scan the wireless access point.

In the present embodiment, when a piece of captured data is captured, it may be determined that a user connects to the wireless access point or scans the wireless access point using the terminal corresponding to the terminal identifier in the captured data.

In the present embodiment, when generating indication information indicating whether the WLAN probe device being abnormal based on the found plurality of pieces of positioning data meeting the preset condition, a ratio parameter may be obtained by dividing the total number of the found pieces of positioning data meeting the preset condition by the total number of all the acquired pieces of captured data in the preset time period. The ratio parameter may be referred to as the entering rate.

When the ratio parameter is greater than or equal to a ratio threshold, for example, 30%, indication information indicating the WLAN probe device being normal may be generated, and when the ratio is less than the ratio threshold, the WLAN probe device of the target point of interest may be abnormal, for example, location of the WLAN probe device at the target point of interest is migrating or there is cheating traffic, and indication information indicating that the WLAN probe device of the target point of interest is abnormal may be generated.

In some alternative implementations of the present embodiment, when generating indication information indicating whether the WLAN probe device being abnormal based on the found plurality of pieces of positioning data meeting the preset condition, a first set of terminal identifiers may be found from the terminal identifiers included in the found plurality of pieces of positioning data meeting the preset condition, that is, all the positioning data meeting the preset condition, and each terminal identifier in the first set of terminal identifiers is different from other terminal identifiers in the first set of terminal identifiers. Any one terminal identifier in the first set of terminal identifiers is identical to a terminal identifier in the at least one piece of positioning data meeting the preset condition among all the positioning data meeting the preset condition. A second set of terminal identifiers may be found from all the acquired plurality of pieces of captured data in the preset time period, that is, in all the acquired captured data in the preset time period, and each terminal identifier in the second set of terminal identifiers is different from other terminal identifiers in the second set of terminal identifiers. Any one terminal identifier in the second set of terminal identifiers is identical to a terminal identifier in the at least one piece of captured data among all the acquired captured data in the preset time period.

For a terminal identifier, when only one piece of positioning data meeting the preset condition among all the positioning data meeting the preset condition includes the terminal identifier, the terminal identifier may be used as a terminal identifier in the first set of terminal identifiers.

For a terminal identifier, when a plurality of pieces of positioning data meeting the preset condition among all the positioning data meeting the preset condition include the terminal identifier, the terminal identifier may be used as a terminal identifier in the first set of terminal identifiers.

For a terminal identifier, when only one piece of captured data among all the acquired captured data in the preset time period includes the terminal identifier, the terminal identifier may be used as a terminal identifier in the second set of terminal identifiers.

For a terminal identifier, when a plurality of pieces of captured data among all the acquired captured data in the preset time period include the terminal identifier, the terminal identifier may be used as a terminal identifier in the second set of terminal identifiers.

When a terminal identifier in the first set of terminal identifiers is included in the plurality of pieces of positioning data meeting the preset condition among all the positioning data meeting the preset condition, it may be determined that the user to which the terminal corresponding to the terminal identifier belongs appears many times in or near the target point of interest in the preset time period and uses the terminal to connect or scan the wireless access point many times in the preset time period.

When a terminal identifier in the second set of terminal identifiers is included in the plurality of pieces of captured data among all the acquired captured data in the preset time period, in other words, a plurality of pieces of captured data among all the captured data in the preset time period include the terminal identifier, it may be determined that the user to which the terminal corresponding to the terminal identifier belongs uses the terminal to connect or scan the wireless access point many times in the preset time period.

After finding the first set of terminal identifiers from the positioning data meeting the preset condition, and finding the second set of terminal identifiers from all the acquired captured data in the preset time period, the number of terminal identifiers included in the first set of terminal identifiers may be divided by the number of terminal identifiers included in the second set of terminal identifiers to obtain a result as the ratio parameter. When the ratio parameter is greater than or equal to the ratio threshold, indication information indicating the WLAN probe device being normal may be generated. When the ratio parameter is less than the ratio threshold, indication information indicating the WLAN probe device being abnormal may be generated.

The number of the terminal identifiers included in the first set of terminal identifiers may be equivalent to the number of users who have appeared in or near the target point of interest in the preset time period and have used the terminal to connect or scan the wireless access point in the preset time period. The number of the terminal identifiers included in the second set of terminal identifiers may be equivalent to the number of users who have connected to or scanned the wireless access point using the terminal in the preset time period.

The number of the terminal identifiers included in the first set of terminal identifiers divided by the number of the terminal identifiers included in the second set of terminal identifiers is equivalent to the ratio of the number of the users who have appeared in or near the target point of interest in the preset time period and have used the terminal to connect or scan the wireless access point in the preset time period to the number of the users who have connected to or scanned the wireless access point using the terminal in the preset time period.

In the present embodiment, the WLAN probe device of the target point of interest may connect to the wireless access point in the target point of interest, and send the captured data to the server through the connected wireless access point in the target point of interest. The wireless access point in the target point of interest connected to the WLAN probe device of the target point of interest is the target wireless access point.

In some alternative implementations of the present embodiment, part of the positioning data in all the acquired captured data in the preset time period further includes an identifier list. Each of the positioning data containing the identifier list each contains an identifier list.

The identifier list in a positioning data containing an identifier list includes one of the following: an identifier of a wireless access point scanned in a time period associated with the positioning time in the positioning data, that is, an identifier of a wireless access point scanned by the terminal having the terminal identifier in the positioning data in a time period associated with the positioning time in the positioning data, an identifier of a wireless access point connected in the time period associated with the positioning time in the positioning data, that is, an identifier of a wireless access point connected to the terminal having the terminal identifier in the positioning data in a time period associated with the positioning time in the positioning data.

The time period associated with the positioning time in the positioning data may be a time period in which the positioning time is the starting time and the duration is a preset duration, for example, 5 minutes, or may be a time period in which the positioning time is the end time and the duration is a preset duration.

When evaluating whether the deployment location of the probe device is reasonable, positioning data meeting a selection condition may be found from the positioning data including the identifier list among all the acquired positioning data in the preset time period. The selection condition includes: an identifier of the wireless access point with the highest signal strength among the identifiers of the scanned wireless access points in the included identifier list is an identifier of a target wireless access point, or an identifier of a connected wireless access point in the included identifier list is the identifier of the target wireless access point. The target wireless access point is in the target point of interest and connected to the WLAN probe device.

When the positioning data meeting the selection condition is found such that the identifier of the wireless access point with the highest signal strength among the identifiers of all the scanned wireless access points in the identifier list included in the positioning data meeting the selection condition is the identifier of the target wireless access point, it may be determined that the user to which the terminal corresponding to the terminal identifier in the positioning data meeting the selection condition belongs scans the target wireless access point having the strongest signal strength among all the wireless access points using the terminal in the time period associated with the positioning time in the positioning data, and the user is very close to the target wireless access point.

When the positioning data meeting the selection condition is found such that the identifier of the connected wireless access point in the identifier list included in the positioning data meeting the selection condition is the identifier of the target wireless access point, it may be determined that the user to which the terminal corresponding to the terminal identifier in the positioning data meeting the selection condition belongs connects to the target wireless access point using the terminal in the time period associated with the positioning time in the positioning data, and the user is very close to the target wireless access point.

After finding the positioning data meeting the selection condition from the positioning data including the identifier list among all the acquired positioning data in the preset time period, captured data meeting a matching condition may be found from all the acquired captured data in the preset time period. The matching condition includes: an included terminal identifier is identical to a terminal identifier in one piece of the positioning data meeting the selection condition, an included identifier of an wireless access point is the identifier of the target wireless access point, and included capture time is within the time period associated with the positioning time in the positioning data.

For the positioning data meeting the selection condition in which the identifier of the wireless access point with the highest signal strength among the identifiers of all the scanned wireless access points in the included identifier list is the identifier of the target wireless access point, when a terminal identifier in a piece of captured data is identical to a terminal identifier in the positioning data meeting the selection condition, the identifier of the wireless access point in the captured data is the identifier of the target wireless access point, and capture time in the captured data is within the time period associated with the positioning time in the positioning data meeting the selection condition, then the captured data meets the matching condition. When the captured data is found, it may be determined that when the user to which the terminal corresponding to the terminal identifier in the positioning data meeting the selection condition belongs scans the target wireless access point having the strongest signal strength among all the wireless access points in the time period associated with the positioning time in the positioning data meeting the selection condition using the terminal, the WLAN probe device of the target point of interest captures captured data including the terminal identifier and the identifier of the target wireless access point in the time period associated with the positioning time, and the WLAN probe device detects that the user has scanned the target wireless access point using the terminal.

For the positioning data meeting the selection condition in which the identifier of the connected wireless access point in the included identifier list is the identifier of the target wireless access point, when a terminal identifier in a piece of captured data is identical to a terminal identifier in the positioning data meeting the selection condition, the identifier of the wireless access point in the captured data is the identifier of the target wireless access point, and capture time in the captured data is within the time period associated with the positioning time in the positioning data meeting the selection condition, the captured data is meets the matching condition. When the captured data is found, it may be determined that when the user to which the terminal corresponding to the terminal identifier in the positioning data meeting the selection condition belongs connects to the target wireless access point in the time period associated with the positioning time using the terminal, the WLAN probe device of the target point of interest captures captured data including the terminal identifier and the identifier of the target wireless access point in the time period associated with the positioning time, and in the time period associated with the positioning time, the WLAN probe device of the target point of interest detects that the user has connected to the target wireless access point using the terminal.

After finding a plurality of pieces of captured data meeting the matching condition among all the acquired captured data in the preset time period, the indication information indicating whether the deployment location of the WLAN probe device is reasonable may be generated based on the found plurality of pieces of captured data meeting the matching condition, thereby evaluating whether the deployment location of the WLAN probe device of the target point of interest is reasonable.

When generating the indication information indicating whether the deployment location of the WLAN probe device of the target point of interest is reasonable based on the found plurality of pieces of captured data meeting the matching condition, the result of the total number of the found captured data meeting the matching condition divided by the total number of the positioning data meeting the selection condition may be defined as the capture rate of the target wireless access point by the WLAN probe device of the target point of interest. When the capture rate is greater than or equal to a capture rate threshold, for example, 60%, indication information indicating that the deployment location of the probe device is reasonable may be generated, and when the capture rate is less than the capture rate threshold, indication information indicating that the deployment location of the probe device is unreasonable may be generated.

When generating the indication information indicating whether the deployment location of the WLAN probe device is reasonable based on the found plurality of pieces of captured data meeting the matching condition, a first set of independent terminal identifiers may be found from the plurality of pieces of captured data meeting the matching condition. Each independent terminal identifier in the first set of independent terminal identifiers is identical to a terminal identifier in the at least one piece of captured data meeting the matching condition, and each terminal identifier in the first set of independent terminal identifiers is different from other terminal identifiers in the first set of independent terminal identifiers. A second set of independent terminal identifiers may be found from the found plurality of pieces of positioning data meeting the selection condition. Each independent terminal identifier in the second set of independent terminal identifiers is identical to a terminal identifier in the at least one piece of positioning data meeting the selection condition, and each terminal identifier in the second set of independent terminal identifiers is different from other terminal identifiers in the second set of independent terminal identifiers.

The result of the total number of terminal identifiers included in the first set of independent terminal identifiers divided by the total number of terminal identifiers included in the second set of independent terminal identifiers may be defined as the capture rate of the target wireless access point by the WLAN probe device of the target point of interest.

In some alternative implementations of the present embodiment, the number of wireless access points in a target point of interest may be multiple. Other wireless access points to which the WLAN probe device of the target point of interest are connected except the target wireless access point in the target point of interest may be determined. The other wireless access points except the target wireless access point in the target point of interest may be determined based on predetermined corresponding relationships between the wireless access points and the point of interest.

For example, the target point of interest is a store, the store includes a plurality of wireless access points, and the shop assistants of the store may use the terminal to send the identifiers of all the wireless access points in the store and the identifier of the store to the server, so that the server may establish the corresponding relationships between the identifiers of the plurality of wireless access points and the store.

After determining other wireless access points in the target point of interest except the target wireless access point, a capture rate of each of the other wireless access points in the target point of interest by the WLAN probe device of the target point of interest is calculated respectively, and indication information indicating whether to add other WLAN probe devices to the target point of interest is generated based on the capture rate of the each of the other wireless access points in the target point of interest by the WLAN probe device, thus evaluating whether the probe device of the target point of interest meets the need. The capture rate of each of the other wireless access points in the target point of interest by the WLAN probe device of the target point of interest may be calculated respectively by referring to the capture rate of the target wireless access point by the WLAN probe device of the target point of interest.

For example, when the capture rates of all the other wireless access points in the target point of interest are greater than the capture rate threshold, then indication information indicating that no other WLAN probe devices needs to be added to the target point of interest may be generated. When the capture rate of any one of the other wireless access points in the target point of interest is less than the capture rate threshold, then indication information indicating that additional WLAN probe devices need to be added to the target point of interest may be generated.

When determining the other wireless access points in the target point of interest except the target wireless access point, positioning data including the identifier list including the identifier of the target wireless access point may be found from the positioning data including the identifier list. In other words, each of the found positioning data includes the identifier list and the identifier of the target wireless access point is included in the identifier list. The other wireless access points in the target point of interest except the target wireless access point may be determined based on a semantic similarity between the identifier of the target wireless access point in the identifier list in the found positioning data and identifiers of the other wireless access points.

For example, the target point of interest is a store, the store deploys a plurality of wireless access points, and the names of the plurality of wireless access points are relatively consistent. The semantic similarity between the identifier of the target wireless access point of the store in the identifier list containing the identifier of the target wireless access point of the store and the identifier of each wireless access point in the identifier list may be calculated respectively. When the semantic similarity between the identifier of a wireless access point and the identifier of the target wireless access point is greater than a similarity threshold, the wireless access point corresponding to the identifier of the wireless access point may be determined as one of the other wireless access points in the store.

Figure 3:
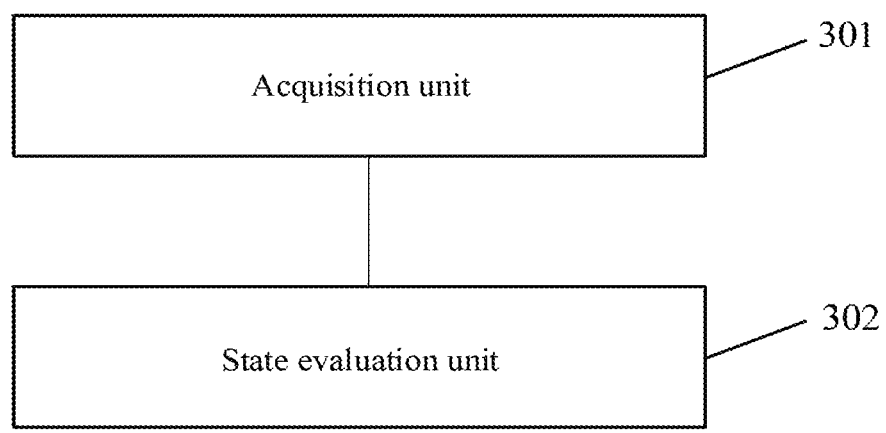
FIG. 3 illustrates a schematic structural diagram of an embodiment of an apparatus for acquiring information according to the present disclosure.

With further reference to FIG. 3, as an implementation to the method shown in the above figures, the present disclosure provides an embodiment of an apparatus for acquiring information. The apparatus embodiment corresponds to the method embodiment shown in FIG. 2.

As shown in FIG. 3, the apparatus for acquiring information of the present embodiment includes: an acquisition unit 301 and a state evaluation unit 302. The acquisition unit 301 is configured to acquire a plurality of pieces of positioning data in a preset time period and a plurality of pieces of captured data captured by a WLAN probe device of a target point of interest in the preset time period, the captured data including: a terminal identifier, capture time, and an identifier of a wireless access point, and the positioning data including: a terminal identifier, positioning time, and a location. The state evaluation unit 302 is configured to find, from the plurality of pieces of positioning data, a plurality of pieces of positioning data meeting a preset condition, and generate, based on the plurality of pieces of positioning data meeting the preset condition, indication information indicating whether the WLAN probe device being abnormal, the preset condition including: an included location being within a preset area associated with the target point of interest, an included terminal identifier matching a terminal identifier in one of the plurality of pieces of captured data, and included positioning time matching the capture time in the captured data.

In some alternative implementations of the present embodiment, the evaluation unit is further configured to: find a first set of terminal identifiers from terminal identifiers included in the plurality of pieces of positioning data meeting the preset condition, and find a second set of terminal identifiers from terminal identifiers included in the plurality of pieces of captured data, each terminal identifier in the first set of terminal identifiers being different from other terminal identifiers in the first set of terminal identifiers, and each terminal identifier in the second set of terminal identifiers being different from other terminal identifiers in the second set of terminal identifiers; divide a number of terminal identifiers included in the first set of terminal identifiers by a number of terminal identifiers included in the second set of terminal identifiers to obtain a ratio parameter; generate indication information indicating the WLAN probe device being normal, when the ratio parameter is greater than or equal to a ratio threshold; and generate indication information indicating the WLAN probe device being abnormal, when the ratio parameter is less than the ratio threshold.

In some alternative implementations of the present embodiment, the apparatus for acquiring information further includes: a location evaluation unit, configured to find a plurality of pieces of positioning data meeting a selection condition from positioning data including an identifier list among the plurality of pieces of positioning data, the identifier list including one of the following: an identifier of a wireless access point scanned in a time period associated with the positioning time in the positioning data, or an identifier of a wireless access point connected in the time period, the selection condition including: an identifier of a scanned wireless access point with a highest signal strength in the included identifier list being an identifier of a target wireless access point or an identifier of a connected wireless access point in the included identifier list being the identifier of the target wireless access point, and the target wireless access point being in the target point of interest and connected to the WLAN probe device; find, from the plurality of pieces of captured data, a plurality of pieces of captured data meeting a matching condition, the matching condition including: an included terminal identifier being identical to a terminal identifier in one piece of positioning data among the plurality of pieces of positioning data meeting the selection condition, an included identifier of a wireless access point being the identifier of the target wireless access point, and included capture time being within the time period associated with the positioning time in the positioning data; and calculate a capture rate of the target wireless access point by the WLAN probe device based on the plurality of pieces of captured data meeting the matching condition, and generate indication information indicating whether a deployment location of the WLAN probe device being reasonable based on the capture rate.

In some alternative implementations of the present embodiment, the apparatus for acquiring information further includes: a need evaluation unit, configured to determine other wireless access points in the target point of interest except the target wireless access point; calculate, respectively, a capture rate of each of the other wireless access points in the target point of interest by the WLAN probe device; and generate indication information indicating whether to add other WLAN probe devices to the target point of interest based on the capture rate of the each of the other wireless access points in the target point of interest by the WLAN probe device.

In some alternative implementations of the present embodiment, the need evaluation unit is further configured to: find positioning data including the identifier list including the identifier of the target wireless access point from the positioning data including the identifier list; and determine the other wireless access points in the target point of interest based on a semantic similarity between the identifier of the target wireless access point in the identifier list in the found positioning data and identifiers of the other wireless access points in the identifier list.

Figure 4:
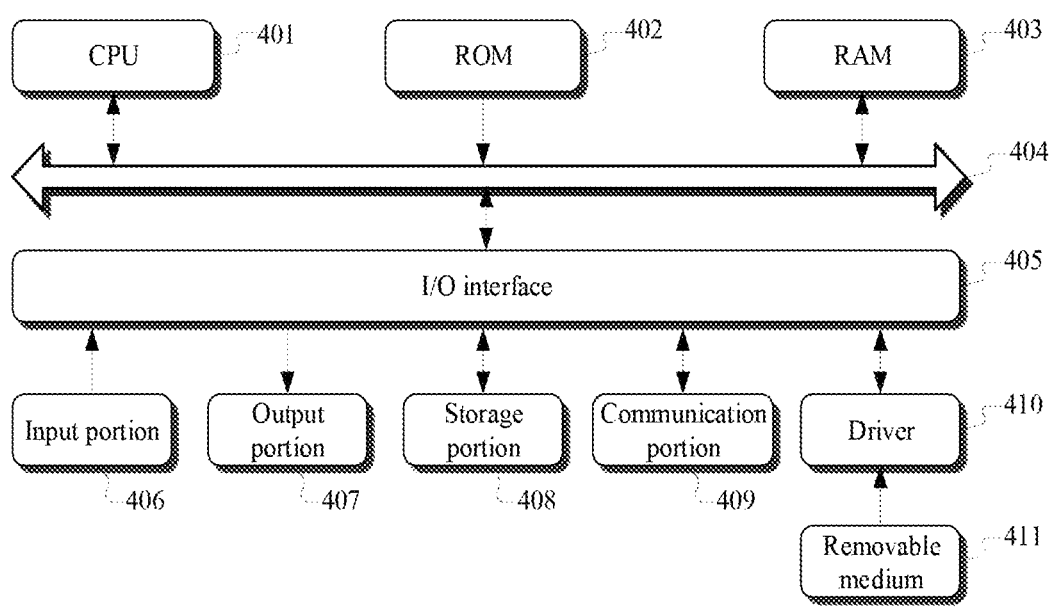
FIG. 4 is a schematic structural diagram of a computer system adapted to implement a server of embodiments of the present disclosure.

FIG. 4 illustrates a structural schematic diagram of a computer system adapted to implement a server of embodiments of the present disclosure.

As shown in FIG. 4, the computer system 400 includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406; an output portion 407; a storage portion 408 including a hard disk and the like; and a communication portion 409 comprising a network interface card, such as a LAN card and a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present disclosure.

The present disclosure further provides a server, the server may be configure with one or more processors; and a memory, for storing one or more programs. The one or more programs may include instructions for performing operations described in above steps 201 to 202. When the one or more programs are executed by the one or more processors, the one or more processors perform the operations described in above steps 201 to 202.

The present disclosure further provides a computer readable medium. The computer readable medium may be the computer readable medium included in the server, or a stand-alone computer readable medium not assembled into the server. The computer readable medium stores one or more programs. The one or more programs, when executed by a server, cause the server to: acquiring a plurality of pieces of positioning data in a preset time period and a plurality of pieces of captured data captured by a Wireless Local Area Network (WLAN) probe device of a target point of interest in the preset time period, the captured data comprising: a terminal identifier, capture time, and an identifier of a wireless access point, and the positioning data comprising: a terminal identifier, positioning time, and a location; and finding, from the plurality of pieces of positioning data, a plurality of pieces of positioning data meeting a preset condition, and generating, based on the plurality of pieces of positioning data meeting the preset condition, indication information indicating whether the WLAN probe device being abnormal, the preset condition comprising: an included location being within a preset area associated with the target point of interest, an included terminal identifier matching a terminal identifier in one of the plurality of pieces of captured data, and included positioning time matching the capture time in the captured data.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising an acquisition unit, and a state evaluation unit.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for acquiring information, the method comprising:

acquiring a plurality of pieces of positioning data in a preset time period and a plurality of pieces of captured data captured by a Wireless Local Area Network (WLAN) probe device of a target point of interest in the preset time period, the captured data comprising: a terminal identifier, capture time, and an identifier of a wireless access point, and the positioning data comprising: a terminal identifier, positioning time, and a location; and finding, from the plurality of pieces of positioning data, a plurality of pieces of positioning data meeting a preset condition, the preset condition comprising: an included location being within a preset area associated with the target point of interest, an included terminal identifier matching a terminal identifier in one of the plurality of pieces of captured data, and included positioning time matching the capture time in the captured data;

finding a first set of terminal identifiers from terminal identifiers included in the plurality of pieces of positioning data meeting the preset condition, and finding a second set of terminal identifiers from terminal identifiers included in the plurality of pieces of captured data, each terminal identifier in the first set of terminal identifiers being different from other terminal identifiers in the first set of terminal identifiers, and each terminal identifier in the second set of terminal identifiers being different from other terminal identifiers in the second set of terminal identifiers;

dividing a number of terminal identifiers included in the first set of terminal identifiers by a number of terminal identifiers included in the second set of terminal identifiers to obtain a ratio parameter; and generating indication information indicating the WLAN probe device being abnormal, when the ratio parameter is less than the ratio threshold.

2. The method according to claim 1, further comprising:
generating indication information indicating the WLAN probe device being normal, when the ratio parameter is greater than or equal to a ratio threshold.

3. The method according to claim 2, further comprising:
finding a plurality of pieces of positioning data meeting a selection condition from positioning data comprising an identifier list among the plurality of pieces of positioning data, the identifier list comprising one of: an identifier of a wireless access point scanned in a time period associated with the positioning time in the positioning data, or an identifier of a wireless access point connected in the time period, the selection condition comprising: an identifier of a scanned wireless access point with a highest signal strength in the included identifier list being an identifier of a target wireless access point or an identifier of a connected wireless access point in the included identifier list being the identifier of the target wireless access point, and the target wireless access point being in the target point of interest and connected to the WLAN probe device;

finding, from the plurality of pieces of captured data, a plurality of pieces of captured data meeting a matching condition, the matching condition comprising: an included terminal identifier being identical to a terminal identifier in one piece of positioning data among the plurality of pieces of positioning data meeting the selection condition, an included identifier of a wireless access point being the identifier of the target wireless access point, and included capture time being within the time period associated with the positioning time in the positioning data; and calculating a capture rate of the target wireless access point by the WLAN probe device based on the plurality of pieces of captured data meeting the matching condition, and generating indication information indicating whether a deployment location of the WLAN probe device being reasonable based on the capture rate.

4. The method according to claim 3, further comprising:
determining other wireless access points in the target point of interest except the target wireless access point;
calculating, respectively, a capture rate of each of the other wireless access points in the target point of interest by the WLAN probe device; and
generating indication information indicating whether to add other WLAN probe devices to the target point of interest based on the capture rate of the each of the other wireless access points in the target point of interest by the WLAN probe device.

5. The method according to claim 4, wherein the determining other wireless access points in the target point of interest except the target wireless access point comprises:
finding positioning data comprising the identifier list comprising the identifier of the target wireless access point from the positioning data comprising the identifier list; and
determining the other wireless access points in the target point of interest based on a semantic similarity between the identifier of the target wireless access point in the identifier list in the found positioning data and identifiers of the other wireless access points in the identifier list.

6. An apparatus for acquiring information, the apparatus comprising:
at least one processor; and
a memory storing instructions, the instructions when executed by the at least one processor, cause the at least one processor to perform operations, the operations comprising:
acquiring a plurality of pieces of positioning data in a preset time period and a plurality of pieces of captured data captured by a Wireless Local Area Network (WLAN) probe device of a target point of interest in the preset time period, the captured data comprising: a terminal identifier, capture time, and an identifier of a wireless access point, and the positioning data comprising: a terminal identifier, positioning time, and a location; and
finding, from the plurality of pieces of positioning data, a plurality of pieces of positioning data meeting a preset condition, the preset condition comprising: an included location being within a preset area associated with the target point of interest, an included terminal identifier matching a terminal identifier in one of the plurality of pieces of captured data, and included positioning time matching the capture time in the captured data;
finding a first set of terminal identifiers from terminal identifiers included in the plurality of pieces of positioning data meeting the preset condition, and finding a second set of terminal identifiers from terminal identifiers included in the plurality of pieces of captured data, each terminal identifier in the first set of terminal identifiers being different from other terminal identifiers in the first set of terminal identifiers, and each terminal identifier in the second set of terminal identifiers being different from other terminal identifiers in the second set of terminal identifiers;
dividing a number of terminal identifiers included in the first set of terminal identifiers by a number of terminal identifiers included in the second set of terminal identifiers to obtain a ratio parameter; and
generating indication information indicating the WLAN probe device being abnormal, when the ratio parameter is less than the ratio threshold.

7. The apparatus according to claim 6, the operations further comprising:
generating indication information indicating the WLAN probe device being normal, when the ratio parameter is greater than or equal to a ratio threshold.

8. The apparatus according to claim 7, the operations further comprising:
finding a plurality of pieces of positioning data meeting a selection condition from positioning data comprising an identifier list among the plurality of pieces of positioning data, the identifier list comprising one of: an identifier of a wireless access point scanned in a time period associated with the positioning time in the positioning data, or an identifier of a wireless access point connected in the time period, the selection condition comprising: an identifier of a scanned wireless access point with a highest signal strength in the included identifier list being an identifier of a target wireless access point or an identifier of a connected wireless access point in the included identifier list being the identifier of the target wireless access point, and the target wireless access point being in the target point of interest and connected to the WLAN probe device;

finding, from the plurality of pieces of captured data, a plurality of pieces of captured data meeting a matching condition, the matching condition comprising: an included terminal identifier being identical to a terminal identifier in one piece of positioning data among the plurality of pieces of positioning data meeting the selection condition, an included identifier of a wireless access point being the identifier of the target wireless access point, and included capture time being within the time period associated with the positioning time in the positioning data; and calculating a capture rate of the target wireless access point by the WLAN probe device based on the plurality of pieces of captured data meeting the matching condition, and generating indication information indicating whether a deployment location of the WLAN probe device being reasonable based on the capture rate.

9. The apparatus according to claim 8, the operations further comprising:

determining other wireless access points in the target point of interest except the target wireless access point;

calculating, respectively, a capture rate of each of the other wireless access points in the target point of interest by the WLAN probe device; and generating indication information indicating whether to add other WLAN probe devices to the target point of interest based on the capture rate of the each of the other wireless access points in the target point of interest by the WLAN probe device.

10. The apparatus according to claim 9, wherein the determining other wireless access points in the target point of interest except the target wireless access point comprises:

finding positioning data comprising the identifier list comprising the identifier of the target wireless access point from the positioning data comprising the identifier list; and determining the other wireless access points in the target point of interest based on a semantic similarity between the identifier of the target wireless access point in the identifier list in the found positioning data and identifiers of the other wireless access points in the identifier list.

11. A non-transitory computer storage medium storing a computer program, the computer program when executed by one or more processors, causes the one or more processors to perform operations, the operations comprising:

acquiring a plurality of pieces of positioning data in a preset time period and a plurality of pieces of captured data captured by a Wireless Local Area Network (WLAN) probe device of a target point of interest in the preset time period, the captured data comprising: a terminal identifier, capture time, and an identifier of a wireless access point, and the positioning data comprising: a terminal identifier, positioning time, and a location; and finding, from the plurality of pieces of positioning data, a plurality of pieces of positioning data meeting a preset condition, the preset condition comprising: an included location being within a preset area associated with the target point of interest, an included terminal identifier matching a terminal identifier in one of the plurality of pieces of captured data, and included positioning time matching the capture time in the captured data;

finding a first set of terminal identifiers from terminal identifiers included in the plurality of pieces of positioning data meeting the preset condition, and finding a second set of terminal identifiers from terminal identifiers included in the plurality of pieces of captured data, each terminal identifier in the first set of terminal identifiers being different from other terminal identifiers in the first set of terminal identifiers, and each terminal identifier in the second set of terminal identifiers being different from other terminal identifiers in the second set of terminal identifiers;

dividing a number of terminal identifiers included in the first set of terminal identifiers by a number of terminal identifiers included in the second set of terminal identifiers to obtain a ratio parameter; and generating indication information indicating the WLAN probe device being abnormal, when the ratio parameter is less than the ratio threshold.

* * * * *